United States Patent [19]

Doong et al.

[11] Patent Number: 5,733,359
[45] Date of Patent: Mar. 31, 1998

[54] PRESSURE SWING ADSORPTION PROCESS TURNDOWN CONTROL

[75] Inventors: Shain-Jer Doong, Millington; Lisa A. Brenskelle, New Providence, both of N.J.

[73] Assignee: The BOC Group, Inc., New Providence, N.J.

[21] Appl. No.: 665,939

[22] Filed: Jun. 19, 1996

[51] Int. Cl.⁶ .................................................. B01D 53/047
[52] U.S. Cl. .................. 95/8; 95/98; 95/101; 95/105; 95/130; 95/138
[58] Field of Search ........................ 95/98, 100–103, 95/105, 130, 138, 8, 12, 23

[56] References Cited

U.S. PATENT DOCUMENTS

| | | | |
|---|---|---|---|
| 3,703,068 | 11/1972 | Wagner | 95/98 X |
| 4,140,495 | 2/1979 | Pietruszewski | 95/98 X |
| 4,299,595 | 11/1981 | Benkmann et al. | 95/98 X |
| 4,315,759 | 2/1982 | Benkmann | 95/98 X |
| 4,323,370 | 4/1982 | Leitgeb | 95/103 X |
| 4,472,177 | 9/1984 | Sircar | 95/98 X |
| 4,494,966 | 1/1985 | Umeki | 95/102 |
| 4,576,614 | 3/1986 | Armond et al. | 95/138 X |
| 4,643,743 | 2/1987 | Grader | 95/100 |
| 4,948,391 | 8/1990 | Noguchi | 95/130 X |
| 5,015,271 | 5/1991 | Reiss | 95/138 X |
| 5,042,994 | 8/1991 | Smolarek | 95/130 X |
| 5,108,467 | 4/1992 | Schröter et al. | 95/103 |
| 5,122,164 | 6/1992 | Hirooka et al. | 95/98 X |
| 5,258,056 | 11/1993 | Shirley et al. | 95/97 X |
| 5,407,465 | 4/1995 | Schaub et al. | 95/101 X |
| 5,441,558 | 8/1995 | Lee et al. | 95/138 X |
| 5,486,226 | 1/1996 | Ross et al. | 95/103 X |
| 5,518,526 | 5/1996 | Baksh et al. | 95/100 |
| 5,520,720 | 5/1996 | Lemcoff | 95/103 X |
| 5,529,607 | 6/1996 | Tan | 95/100 X |
| 5,536,299 | 7/1996 | Girard et al. | 95/101 |

*Primary Examiner*—Robert Spitzer
*Attorney, Agent, or Firm*—Coleman R. Reap; Salvatore P. Pace

[57] ABSTRACT

The flow rate of a nonadsorbed product gas stream from a multiple unit PSA plant can be reduced in response to a reduced product demand by isolating all units in the plant and inserting an idle step into the adsorption cycle immediately following bed equalization steps of the cycle. In a preferred embodiment, the duration of the idle step is inversely proportional to the percentage reduction in the product demand. To maintain the product gas purity at the desired level, minor adjustments of the idle step duration can be made following adjustment to the idle step in response to a change in product demand.

18 Claims, 5 Drawing Sheets

STEP A

STEP B

STEP C

STEP D

STEP E

STEP F

STEP G

STEP H

PRESSURE SWING ADSORPTION PROCESS TURNDOWN CONTROL

FIELD OF THE INVENTION

This invention relates to the operation of pressure swing adsorption plants, and more particularly to a method of adjusting the rate of production of nonadsorbed product gas in a pressure swing adsorption plant without significantly altering the purity of the product gas.

BACKGROUND OF THE INVENTION

Adsorption is widely used in the separation of the components of gas mixtures. In general, this technique can be used to separate a component from a gas mixture using a selected adsorbent when the adsorbent preferentially adsorbs the component relative to the other components of the mixture. This procedure is successfully used to separate nitrogen from oxygen using either an adsorbent which preferentially adsorbs nitrogen or an adsorbent which preferentially adsorbs oxygen.

Pressure swing adsorption (PSA) systems typically operate in a cyclical process in which adsorption vessels containing adsorbent are pressurized to operating pressure with a feed gas, components of the feed gas are fractionated by adsorption as the feed gases pass through the adsorption vessels, and the adsorbent is regenerated to remove the adsorbed component from the adsorption vessel. The desired component may be concentrated in either the nonadsorbed fraction or the adsorbed fraction. When multiple beds are used, one or more pressure equalization step may be employed to equalize the pressure between a bed that is saturated with the adsorbed fraction and a bed that has been regenerated and in which the concentration of adsorbed component is considerably diminished.

PSA plants are generally sized to satisfy the product gas quantity and quality requirements of the gas user. The product gas quantity demand of the user is often not constant, and frequently fluctuates from time to time during the course of business operations. To accommodate the needs of the gas user the plant is designed to produce the maximum quantity of gas product anticipated to be required by the user at a purity specified by the user.

It is likely in the commercial operation of PSA systems that demand for product gas may increase or decrease from time to time. For example, PSA systems are often required to produce product gas at higher rates during normal working hours than during off-hours. Various methods of meeting this variable demand while maintaining product purity have been attempted. Product reduction or turndown measures sometimes practiced include venting excess product gas, lengthening the cycle time, storing excess product gas, or temporarily shutting down the system.

Wagner, U.S. Pat. No. 3,703,068, discloses a multi-bed PSA system wherein the pressurization rate of successive beds is controlled by the introduction of fluctuations in the product flow and pressure.

Pfetruszewski, U.S. Pat. No. 4,140,495, discloses the regulation of the quantity of product gas withdrawn by advancing cycles in successive and parallel cycle systems rather than running them concurrently.

Sebastian et al., U.S. Pat. No. 4,197,096, discloses the use of a variable rate compressor pump to correlate product demand to product supply.

Leitgeb, U.S. Pat. No. 4,323,370, discloses varying the length of time of the adsorption phase and the rate of flow of the product gas from the adsorber in response to a varying demand for the product gas. The flow rate and adsorption cycle times are determined as a function of a desired product gas purity and not of the actual product produced by the system.

Armond et al., U.S. Pat. No. 4,576,614 discloses regulating product turndown in a multi-bed system by varying the bed equalization time.

Shirley et al., U.S. Pat. No. 5,258,056 discloses varying the product gas flow rate of nonadsorbed gas in a PSA system by sensing a change in product demand and, in response thereto, varying the rate of flow of feed gas to the system.

It is known that for a given rate of gas production, a variation in the feed flow rate will cause an undesirable change in the purity of the gas product. This purity drift occurs because a change in the feed rate affects the manner in which the feed gas contacts the adsorbent material, such as by reducing the amount of time the feed gas is in contact with the adsorbent bed. As a result, varying the feed rate will vary the rate of gas production at the expense of the purity of the product.

It is also known that control of the purity level of a product gas can be accomplished in PSA systems by varying the product flow rates at a fixed cycle time. The product flow rate is set at a level greater than that needed by the consumer while the feed gas flow rate either is fixed by throttling or regulated automatically.

Purity control in the form of inventory control employing a surge vessel is disclosed in European Patent Publication No. 0 135 921.

Miller et al., U.S. Pat. No. 4,693,730, disclose a product purity control pressure swing adsorption process in which a characteristic of the effluent from concurrent depressurization is sensed, and corrective action is taken in response. Any action can be taken which is effective to vary the impurity concentration in the product gas including adjusting the adsorption time to control the impurity loading of each adsorbent bed, adjusting the concurrent depressurization termination pressure to control the impurity breakthrough at the product end of each adsorbent bed, and/or adjusting the amount of purge gas received from each adsorbent bed to control the extent of regeneration.

European Patent Publication No. 0 207 686 discloses controlling oxygen concentration by controlling variations in the cycle time at which a further adsorption bed is substituted for any exhausted or substantially exhausted bed prior to the purging of the latter bed.

Gunderson, U.S. Pat. No. 4,725,293, discloses a process of controlling purity by small variations in the feed flow rate while allowing product flow to vary at the choice of the consumer.

Umeki, U.S. Pat. No. 4,494,966, discloses a two-vessel PSA process comprising the steps of adsorption, bed equalization and bed regeneration in which the process is shut down during the equalization step and the beds are evacuated.

Schroter et al., U.S. Pat. No. 5,108,467 discloses the inclusion of an idle step following the bed regeneration step of a nitrogen PSA process cycle to increase the amount of nitrogen produced in the process.

Correcting for changes in product demand by currently known techniques usually leads to an undesirable change in product gas purity level. PSA process improvements which compensate for variations in product demand without significant changes in product gas purity are constantly being sought. This invention presents a PSA process improvement which provides the advantage of adjusting the production volume of PSA product gas with minimal variation in the purity of the product gas, and provides a power savings, relative to other methods of compensating for a reduced demand of nonadsorbed product gas.

SUMMARY OF THE INVENTION

The process of the invention provides a method of varying the rate of production of nonadsorbed gas from a pressure swing adsorption plant while at the same time reducing the cost of operating the facility, relative to the cost of operating the facility when other production rate modification techniques are employed. The method of the invention comprises introducing an idle step into the process cycle during which the feed blower and vacuum pump (if one is used) are unloaded, i.e. operated in a bypass mode. The idle step is inserted into the process cycle at the end of the bed equalization step, or, if the cycle comprises a first discrete equalization step (a step with simple transfer of gas from one vessel to another) and a second combination equalization-vent step or equalization-purge step, at the end of the discrete equalization step.

According to a broad embodiment, the invention has application in a method of producing a first component-enriched product gas from a mixture comprising the first component and a second component at a rate of production set by downstream demand for the product gas by subjecting the gas mixture to a PSA process in a system comprising a plurality of adsorption vessels each containing an adsorbent which adsorbs the second component more strongly than it adsorbs the first component, the PSA process having a repeating cycle which includes the steps:

(a) flowing the gas mixture at a selected pressure cocurrently through a first adsorption vessel of the system, thereby adsorbing second component-enriched fraction and discharging first component-enriched product gas from the first adsorption vessel;

(b) partially pressurizing a second adsorption vessel of the system by flowing void space gas from the first vessel into the second vessel; and (c) pressurizing the second adsorption vessel to the selected pressure by cocurrently flowing the gas mixture into the second adsorption vessel.

The invention comprises changing the rate of production of first component-enriched gas stream in the system in response to a change in the first component-enriched gas demand by periodically isolating each vessel of the system and subjecting the system to an idle step of predetermined duration between the above-described steps (b) and (c).

In a preferred embodiment of the invention the duration of the current idle step is the difference between (1) the product of the previous cycle time determined without adjustment for purity and the ratio of the previous product demand to the current product demand and (2) the current cycle time without an idle step (the terms used in this calculation are defined below).

Another preferred embodiment of the invention comprises making an adjustment for purity by measuring the purity of the first component-enriched gas and adjusting the duration of the current idle step in a manner that will minimize the difference between the specified purity and the measured purity.

A most preferred embodiment of the invention comprises using as an approximation of the duration of the current idle step the difference between (1) the product of the previous cycle time determined without adjustment for purity and the ratio of the previous product demand to the current product demand and (2) the current cycle time without an idle step, and then measuring the purity of the first component-enriched gas and further adjusting the duration of the current idle step in a manner that will minimize the difference between the specified purity and the measured purity.

In a modification of the above-described broad embodiment of the invention the process cycle includes, between the idle step and step (c), the additional step of further pressurizing the second adsorption vessel by countercurrently flowing first component-enriched gas into the second vessel.

In a preferred embodiment of the invention the adsorption system comprises at least one pair of first and second adsorption vessels operated 180° out of phase, and the PSA process comprises, with respect to each pair of adsorption vessels in the system, the steps:

(a) flowing the gas mixture cocurrently through the first adsorption vessel at a selected pressure, thereby adsorbing second component-enriched fraction and discharging first component-enriched fraction from the first adsorption vessel, while desorbing second component-enriched fraction from the second adsorption vessel by countercurrently depressurizing the second adsorption vessel;

(b) partially pressurizing the second adsorption vessel by flowing gas from the first adsorption vessel into the second adsorption vessel;

(c) isolating the first and second adsorption vessels and idling the process;

(d) flowing the gas mixture cocurrently through the second adsorption vessel at the selected pressure, thereby adsorbing second component-enriched fraction and discharging first component-enriched fraction from the second adsorption vessel while desorbing second component-enriched fraction from the first adsorption vessel by countercurrently depressurizing the first adsorption vessel;

(e) partially pressurizing the first adsorption vessel by flowing gas from the second adsorption vessel into the first adsorption vessel; and (f) isolating the first and second adsorption vessels and idling the process.

In the preferred aspect of this embodiment of the invention the duration of steps (c) and (f) is the difference between (1) the product of the previous cycle time determined without adjustment for purity and the ratio of the previous product demand to the current product demand and (2) the current cycle time without an idle step.

Another preferred aspect of this embodiment of the invention comprises measuring the purity of the first component-enriched gas and adjusting the duration of steps (c) and (f) in a manner that will minimize the difference between the specified purity and the measured purity.

A most preferred aspect of this embodiment of the invention comprises using as an approximation of the duration of steps (c) and (f) the difference between (1) the product of the previous cycle time determined without adjustment for purity and the ratio of the previous product demand to the current product demand and (2) the current cycle time without an idle step, and then measuring the purity of the first component-enriched gas and further adjusting the duration of steps (c) and (f) in a manner that will minimize the difference between the specified purity and the measured purity.

In a first modification of the above-described preferred embodiment of the invention the process cycle further includes, between step (c) and step (d), the additional step of further pressurizing the second adsorption vessel by countercurrently flowing first component-enriched gas thereinto and between steps (f) and (a), the additional step of further pressurizing the first adsorption vessel by countercurrently flowing first component-enriched gas thereinto.

In another modification of the preferred embodiment the cycle includes, between steps (a) and (b) the additional step of flowing the gas mixture cocurrently through the first adsorption vessel at the selected pressure and discharging first component-enriched fraction from the first adsorption vessel, while countercurrently flowing first component-enriched gas through the second adsorption vessel, and between steps (d) and (e) the additional step of flowing the gas mixture cocurrently through the second adsorption vessel at the selected pressure and discharging first component-enriched fraction from the second adsorption vessel, while countercurrently flowing first component-enriched gas through the first adsorption vessel.

In another modification of the preferred embodiment, the cycle further comprises, between steps (c) and (d), the additional step of flowing void space gas from the first adsorption vessel to the second adsorption vessel while countercurrently removing gas from the first adsorption vessel and, between steps (f) and (a), the additional step of flowing void space gas from the second adsorption vessel to the first adsorption vessel white countercurrently removing gas from the second adsorption vessel.

In a variation of the above-mentioned first modification of the preferred embodiment, the cycle further includes, between steps (a) and (b), the additional step of flowing the gas mixture at the selected pressure cocurrently through the first adsorption vessel at the selected pressure and discharging first component-enriched fraction from the first adsorption vessel, while countercurrently flowing first component-enriched gas through the second adsorption vessel; between steps (c) and said additional step between steps (c) and (d), the further step of flowing void space gas from the first adsorption vessel to the second adsorption vessel while countercurrently removing gas from the first vessel; between steps (d) and (e) the additional step of flowing the gas mixture at the selected pressure cocurrently through the second adsorption vessel at the selected pressure and discharging first component-enriched fraction from the second adsorption vessel, while countercurrently flowing first component-enriched gas through the first adsorption vessel; and between steps (f) and said additional step between steps (f) and (a), the further step of flowing void space gas from the second adsorption vessel to the first vessel while countercurrently removing gas from the second adsorption vessel.

In another modification of the process of the invention the adsorption system comprises three adsorption vessels operated 120° out of phase.

In a preferred aspect of the above-described embodiments of the invention the first component is oxygen and said second component is nitrogen In another preferred aspect of the above-described embodiments the gas mixture is air, the first component is oxygen and the second component is nitrogen. In this aspect the adsorbent is selected from synthetic and natural zeolites, and in a more preferred aspect it is a synthetic zeolite selected from type X zeolite and type A zeolite. Also, in this aspect the adsorption pressure is preferably in the range of about atmospheric pressure to about 3 bara.

In another preferred aspect of the above-described embodiments the gas mixture is air, the first component is nitrogen and the second component is oxygen.

BRIEF DESCRIPTION OF THE DRAWINGS

The invention is illustrated in the appended drawings, in which.

The same reference numerals and letters are used to represent the same or similar parts in the various drawings.

DETAILED DESCRIPTION OF THE INVENTION

The improved process of the invention is useful for varying the rate of production of a purified gas by PSA. The process can be used to separate air to produce either nitrogen or oxygen as the nonadsorbed gas product, or it can be used to separate the components of gas mixtures other than air. By virtue of the invention the rate of production of the nonadsorbed gas product is varied without significantly changing the purity of this gas. This result is accomplished by inserting an idle step into the adsorption cycle immediately following discrete bed equalization, or by increasing or decreasing the duration of the idle step in an adsorption cycle with an existing idle step. Inserting an idle step into the adsorption cycle at this point causes very little or no variation in the nonadsorbed gas product purity.

During the idle step all adsorption vessels of the system are isolated and the feed compressor and vacuum pump associated with the system are unloaded, thereby effecting power savings.

Figure 1:
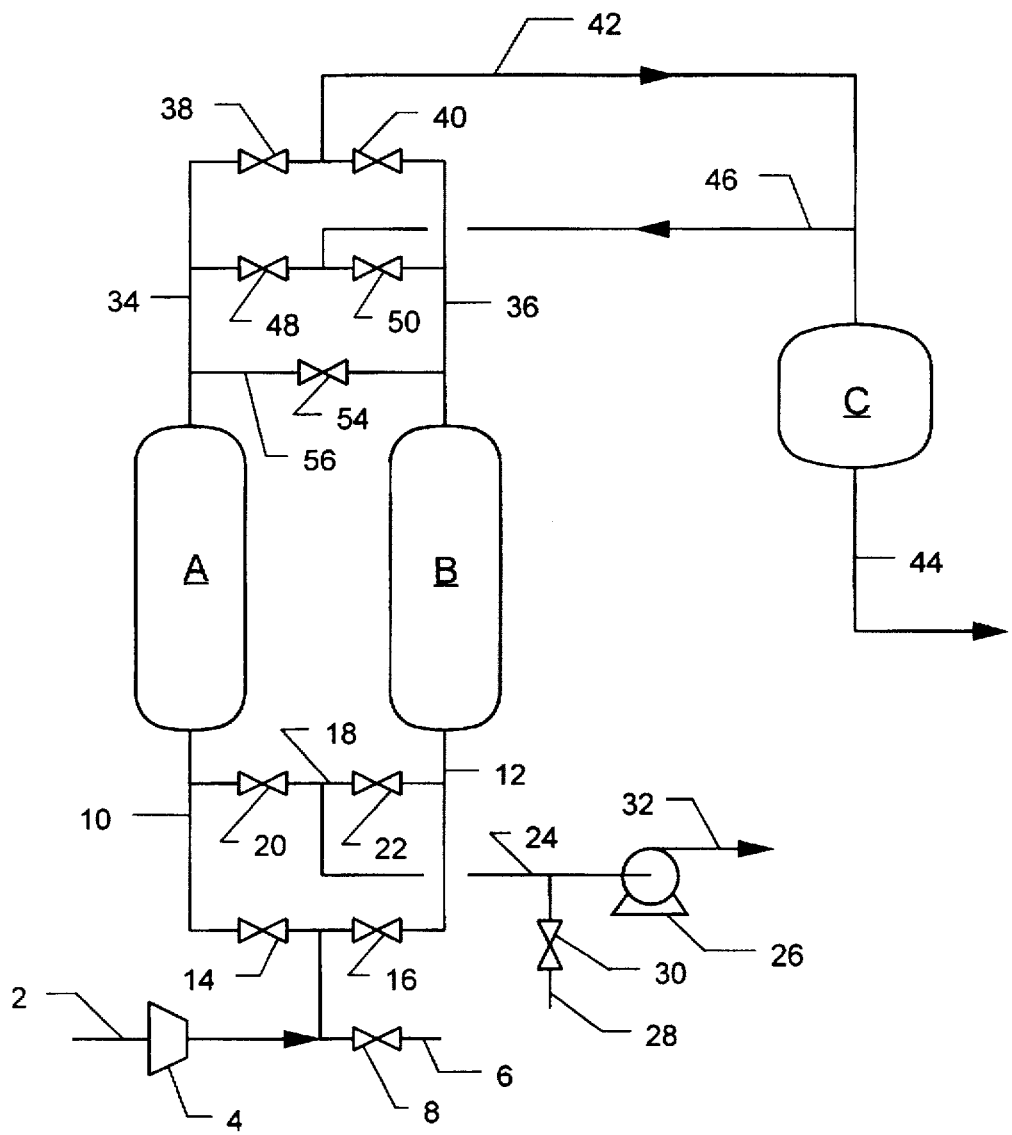
FIG. 1 is a schematic representation of a two-bed adsorption plant equipped for practice of the process of this invention.

FIG. 1 illustrates a two adsorption vessel plant in which the invention can be carried out. The system of FIG. 1 includes first and second adsorption vessels, A and B, and a nonadsorbed gas product reservoir, C. Vessels A and B are conventional vessels constructed to withstand the superatmospheric and subatmospheric pressures encountered in pressure swing adsorption processes. Feed gas line 2, provided with feed gas compressor 4 is used to introduce feed gas into the system. Connected to line 2 downstream of compressor 4 is unload gas discharge line 6, which is provided with valve 8. Downstream of compressor 4, line 2 is also connected to the inlet ends of vessels A and B via lines 10 and 12, which are provided with valves 14 and 16, respectively. Bed depressurization manifold 18 is connected to line 10 through valve 20 and to line 12 through valve 22. Bed evacuation line 24 connects manifold 18, at a point between valves 20 and 22, with the inlet end of vacuum pump 26. Vacuum pump unload feed line 28, fitted with valve 30, is connected to line 24. On its discharge end, vacuum pump 26 is provided with waste gas discharge line 32.

Vessels A and B are provided with nonadsorbed gas outlet lines 34 and 36, which are fitted with valves 38 and 40, respectively. At their downstream ends, lines 34 and 36 are joined to nonadsorbed gas discharge line 42 which, in turn, is connected to nonadsorbed gas storage vessel C. Vessel C is also provided with nonadsorbed gas product line 44 and with bed product backfill line 46. Line 46 communicates with lines 34 and 36 through valves 48 and 50, respectively. Equalization gas line 56, fitted with valve 54 connects line 34 to line 36.

Figure 2:
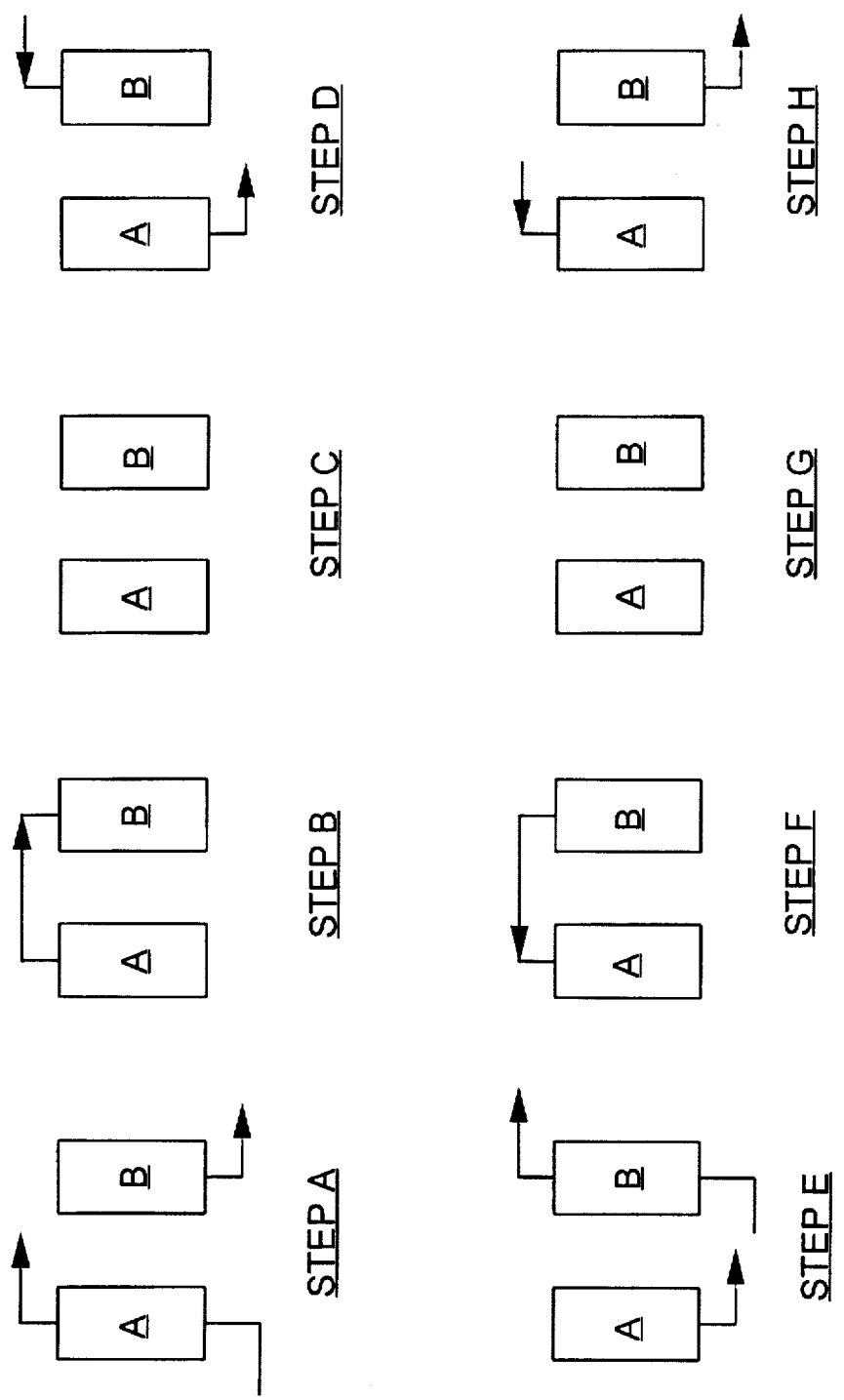
FIG. 2 is a schematic representation of a simple two-bed adsorption cycle incorporating the improvement of the invention.

Operation of the system of FIG. 1 will be described with reference to the cycle diagrams of FIGS. 2 and 3. FIG. 2 illustrates an 8 step process carried out in a pair of adsorption vessels that are operated 180° out of phase, such that when the adsorbent in one vessel is in adsorption service the adsorbent in the other vessel is undergoing regeneration. The steps of the half-cycle shown as steps A to D and the half cycle shown as steps E to H are adsorption/evacuation, bed equalization, idle and evacuation/product backfill, respectively.

During step A (adsorption/evacuation), valves 14, 38 and 22 are open and all other valves are closed, and compressor 4 and vacuum pump 26 are in service. Feed gas, charged into vessel A at superatmospheric pressure by compressor 4, passes through lines 2 and 10 and weakly adsorbed component-enriched fraction passes out of vessel A through lines 34 and 42 and enters vessel C while the strongly adsorbed component of the gas mixture is adsorbed by the adsorbent in vessel A. Meanwhile, the vessel B evacuation step begun in step H of the previous cycle, is continued, and additional strongly adsorbed component-enriched fraction is drawn from the adsorbent in vessel B through lines 12 and 24 by vacuum pump 26. The evacuated gas is discharged from the system through line 32.

Upon completion of step A, step B is initiated by the closing of valves 14, 22 and 38 and the opening of valves 8, 30 and 54. All other valves of the system remain closed during this step. A portion of the void space gas previously contained in vessel A now passes via valve 54 through lines 34 and 36 and into vessel B. Although this step is referred to as "bed equalization", the transfer of gas is often discontinued before the pressure in vessels A and B is equalized. During this step compressor 4 and pump 26 are unloaded, such that feed gas drawn through line 2 by compressor 4 is discharged from the system through line 6, and gas in drawn into line 24 through line 28 and is discharged from the system through line 32.

Upon completion of step B, step C (idle) is begun. During this step, valve 54 is closed, all other valves remain in the position they were in during step B, and the system is idled. The duration of step C is such that the nonadsorbed gas produced during the current cycle is approximately equal to the nonadsorbed product gas demand. The step C duration can be determined by any suitable method, but it is preferably determined by means of the formula described below, which is based on the rate of removal of nonadsorbed product gas from vessel C through line 44. The duration of the idle step is also adjusted somewhat to compensate for changes in the purity of the nonadsorbed product gas produced during the turndown period. During step C, compressor 4 and pump 26 remain unloaded.

During step D (bed evacuation/product backfill), valves 8, 20 and 50 are open and valve 28 is closed. Strongly adsorbed component-enriched fraction is now evacuated from vessel A and discharged from the system by vacuum pump 26 through lines 10, 24 and 32. During this step the pressure in vessel B is raised to near adsorption pressure by introducing nonadsorbed product gas countercurrently into vessel B through lines 46 and 36. Compressor 4 remains unloaded.

Upon completion of the above half-cycle the second half-cycle is begun, wherein the roles of vessels A and B are reversed.

During step E, valves 16, 20 and 40 are open and all other valves are closed, and feed gas is charged into vessel B at superatmospheric pressure by compressor 4. The feed gas passes through lines 2 and 12 and weakly adsorbed component-enriched fraction passes out of vessel B through lines 36 and 42 and enters vessel C, while the strongly adsorbed component of the gas mixture is adsorbed by the adsorbent in vessel B. During this period, the vessel A evacuation step begun in step D is continued, and additional strongly adsorbed component-enriched fraction is withdrawn from the adsorbent in vessel A, passes through lines 10 and 24 and vacuum pump 26, and is discharged from the system through line 32.

Upon completion of step E, step F is initiated by the closing of valves 16, 20 and 40 and the opening of valves 8, 30 and 54. All other valves remain closed. A portion of the void space gas previously contained in vessel B passes via valve 54 through lines 36 and 34 and into vessel A. During this step compressor 4 and pump 26 are unloaded, and feed gas drawn through line 2 by compressor 4 is discharged from the system through line 6 and gas drawn into line 24 through line 28 and valve 30 is passed through pump 26 and discharged from the system through line 32.

Upon completion of step F, step G is begun. During this step, valve 54 is closed, all other valves remain in the position they were in during step F, and the system is idled. Compressor 4 and pump 26 remain unloaded during this step.

Upon completion of the idle step, step H is initiated with valves 8, 22 and 48 open and valve 28 is closed. Strongly adsorbed component-enriched fraction is now evacuated from vessel B and discharged from the system by vacuum pump 26 through lines 12, 24 and 32. During this step the pressure in vessel A is raised to near adsorption pressure by introducing nonadsorbed product gas into vessel A through lines 46 and 34. Compressor 4 remains unloaded.

At the completion of step H the second half-cycle of the process is finished, and the cycle is repeated, beginning with step A.

Figure 3:
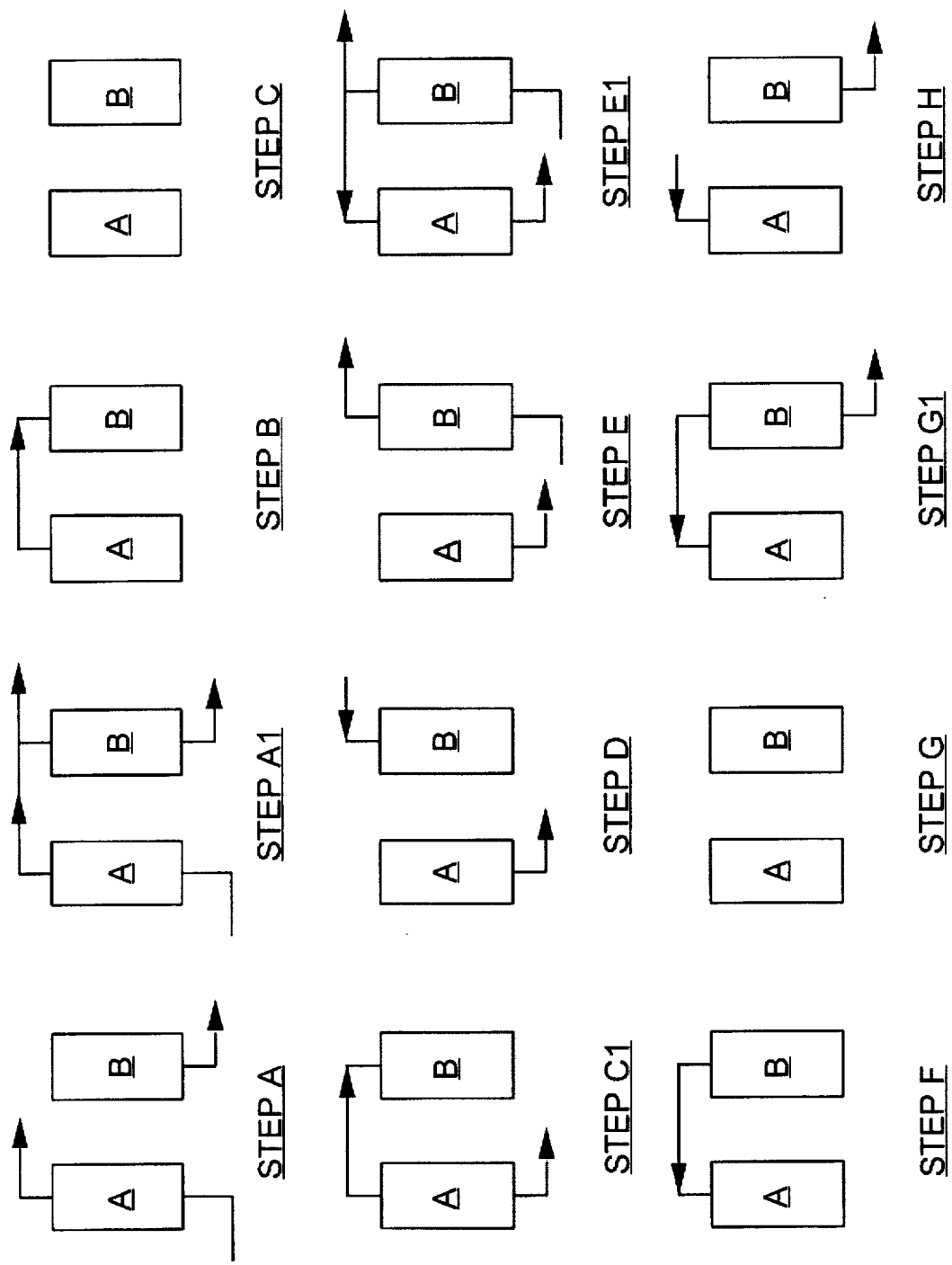
FIG. 3 is a schematic representation of a preferred two-bed cycle incorporating the improvement of the invention.

FIG. 3 illustrates a more efficient embodiment of the process illustrated in FIG. 2. In the process of FIG. 3, steps A, B, C, D, E, F, G and H are substantially identical with steps of the same letter of the process illustrated in FIG. 2. In addition to these eight steps the FIG. 3 process includes four new steps, namely steps A1, C1, E1, and G1. The cycle of FIG. 3 is based on the process illustrated in FIG. 4A to 4J of U.S. Pat. No. 5,122,164. The text of this patent is incorporated herein by reference.

Step A1 of the FIG. 3 process is a continuation of step A of this process. During step A1 valves 14, 22 and 38 remain open and valve 40 is opened. The production of nonadsorbed product gas is continued in vessel A. The evacuation of vessel B is continued but a portion of the nonadsorbed product gas produced in vessel A is passed through vessel B generally at a reduced pressure, to effect purging of vessel B. Step A1 is followed by steps B and C, which are the same as steps B and C of the process of FIG. 2.

Following step C the process is continued with step C1. Step C1 is a partial continuation of the equalization step (step B); however, in step C1 the adsorbent in vessel A begins to undergo evacuation. During step C1 valves 8, 20 and 54 are opened, valve 30 is closed and vessel B is further pressurized by transfer of gas from vessel A through the non-adsorbed ends of the vessels. At the same time gas is withdrawn from vessel A through its inlet end by means of pump 26. The evacuated gases pass out of the system through lines 10, 24 and 32.

Following step C1, step D is initiated by closing valve 54 and opening valve 50. Valve 20 remains opened during step D so that evacuation of the bed in vessel A continues while vessel B undergoes partial repressurization with non-adsorbed product gas. Step E is identical to step E of the process of FIG. 2. During step E valves 16, 20 and 40 are opened and all other valves are closed. Step E1 the counterpart to step A1, is a partial continuation of the procedure carried out in step E. During step E1, valves 16, 20 and 40 remain opened and valve 38 is opened. This permits a portion of the non-adsorbed product gas produced in vessel B to pass countercurrently through vessel A, thereby purging the adsorbent in vessel A. At the completion of step E1, valves 16, 20, 38 and 40 are closed and valve 54 is opened to initiate step F. Step F is the counterpart to step B. In the process illustrated in FIG. 3, step G is identical to step C, and during this step all valves except valves 8 and 30 are closed and the system is idled, during which period blower 4 and pump 26 are unloaded.

Following step G, step G1, which is the counterpart to step C1 is initiated. Step G1 is a partial continuation of the equalization procedure of step F. Accordingly, valve 30 is closed and valves 8 and 54 are opened. Additionally valve 22 is opened and the bed in vessel B begins to undergo evacuation.

At the completion of step G1 step H is initiated by closing valve 54 and opening valve 48. Step H serves to prepare the beds for the start of a new cycle by raising the pressure of the bed in vessel A to near adsorption pressure while evacuating bed B.

The processes illustrated in FIGS. 2 and 3 are representative of adsorption processes in which the idle step of this invention can be practiced. The principle requirement of processes suitable for practice of the present invention is that the processes include a bed equalization step. In all cases the idle step follows bed equalization in processes which include two equalization steps, such as the process of FIG. 3, the idle step follows the first bed equalization step.

The adsorption step of the process of this invention can be carried out at any useful pressure, however it is generally carried out at absolute pressures in the range of about 1 to about 20 atmospheres and, is preferably carried out at absolute pressures in the range of about 1 to about 10 atmospheres. The bed regeneration step maybe carried out at absolute pressures in the range of about 100 torr to about 5 atmospheres and is preferably carried out at absolute pressures in the range of about 200 torr to about 1 atmosphere. The pressure at which the process is carried out is not critical to the success of the process, however selection of pressure ranges does have an impact on the cost of energy for operation of the process.

The duration of the steps of the process is a matter of choice and can be varied to provide the desired product purity and non-adsorbed gas yield for the process. Typical full cycle times vary from about 1 minute to about 5 minutes.

As noted above, the duration of the idle step depends upon the quantity of non-adsorbed gas demand at any given time. When the product demand is equivalent to the full capacity of the adsorption system, the idle time is 0, i.e. the process does not include an idle step. When an idle step is included in the process cycle, the duration of the idle step can be determined by any suitable method. A close approximation of the appropriate new idle step duration, referred to as $ISD_{FF}$ (idle step duration, feed forward component), can be made using the formula:

$$ISD_{FF}=(PD/CD) \times PCT - CCT_o$$

wherein "PCT" is the duration of the previous cycle, including the time required for the idle step, if an idle step occurs in the previous cycle, but determined without adjustment for purity; $CCT_o$ is the current cycle time without an idle step; "PD" is the volume demand of first component-enriched gas, i.e. nonadsorbed gas product, being withdrawn from the system by the user at the time of the previous cycle, and "CD" is the volume demand of first component-enriched gas required by the user at the time of the current cycle. PD and CD are expressed in the same units and $CCT_o$ and ISD are preferably expressed in seconds. In the formula the "previous cycle" is the cycle in operation at the time of, or just prior to, the latest change in product demand, i.e. the change for which the adjustment of the idle step duration is being determined; and the "current cycle" is the cycle just after the latest change in product demand.

It is important to maintain the purity of the product gas at the desired level. If the purity is too low the product gas will likely not be suitable for the purpose intended, and if it is too high energy is wasted maintaining the high purity level. Accordingly, after introduction into the adsorption cycle of an idle step or after a change in the duration of the idle step it is desirable to determine the purity level and make any changes in the idle step duration necessary to readjust the product gas purity to the desired level. In making purity level corrections the purity of the product gas is measured at any given time, and the duration of the idle step is increased slightly, if the product purity is higher than the desired purity, or decreased slightly, if the product purity is lower than the desired purity. The change in the duration of the idle step as a result of a correction for purity is referred to herein as "$ISD_{FB}$", which stands for "idle step duration, feedback component". It can be appreciated that $ISD_{FB}$ may be positive or negative, depending on the purity of the gas at the time of the measurement.

The preferred procedure for making adjustments in the duration of the idle step to compensate for a change in product volume demand is to employ both of the above corrections, i.e. to algebraically sum the feed forward component and the feedback component of the idle step duration. In other words:

$$ISD=ISD_{FF}+ISD_{FB}$$

The $ISD_{FF}$ adjustment is usually made only once after a change in product demand is signaled, whereas the $ISD_{FB}$ may be made repeatedly to correct for drifting of the purity level of the product gas.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE 1

The runs of this example were carried out in the two-bed adsorption system illustrated in FIG. 1, using the adsorption cycle shown in FIG. 3. Each bed used in the runs had a volume of 0.25 m³ and was packed with zeolite 5A. The feed gas was air and the adsorption was carried out at ambient temperature. The adsorption step was conducted at an absolute pressure of 19.7 psi and the vacuum step was carried out to an absolute pressure of 250 torr. The steps of the cycle were labeled with the same step labels used in FIG. 3. Three runs were conducted at three different oxygen product gas flow rates. In Run 1, in which the duration of steps C and G (the idle steps) was 0 secs; Run 2, in which the duration of steps C and G was 13.5 secs and Run 3, in which the duration of steps C and G was 35 secs. The duration of the following steps was held constant at the indicated times: steps A and E—43 secs; steps A1 and E1—10 secs; steps B and F—6 secs; steps C1 and G1—3 secs; and steps D and H—3 secs. The flow rates, oxygen product gas purities, and contributions for the feed forward and feedback components of the duration of steps C and G are listed in the Table for each run.

TABLE

| Run | Product Flow, Nm³/Hr. | O₂ Purity, % | ISD, secs | ISD$_{FP}$, secs | ISD$_{FB}$, secs |
|---|---|---|---|---|---|
| 1 | 6.4 | 90 | 0 | 0 | 0 |
| 2 | 5.22 | 90 | 13.5 | 14.7 | −1.2 |
| 3 | 4.0 | 90 | 35 | 39 | −4 |

Figure 4:
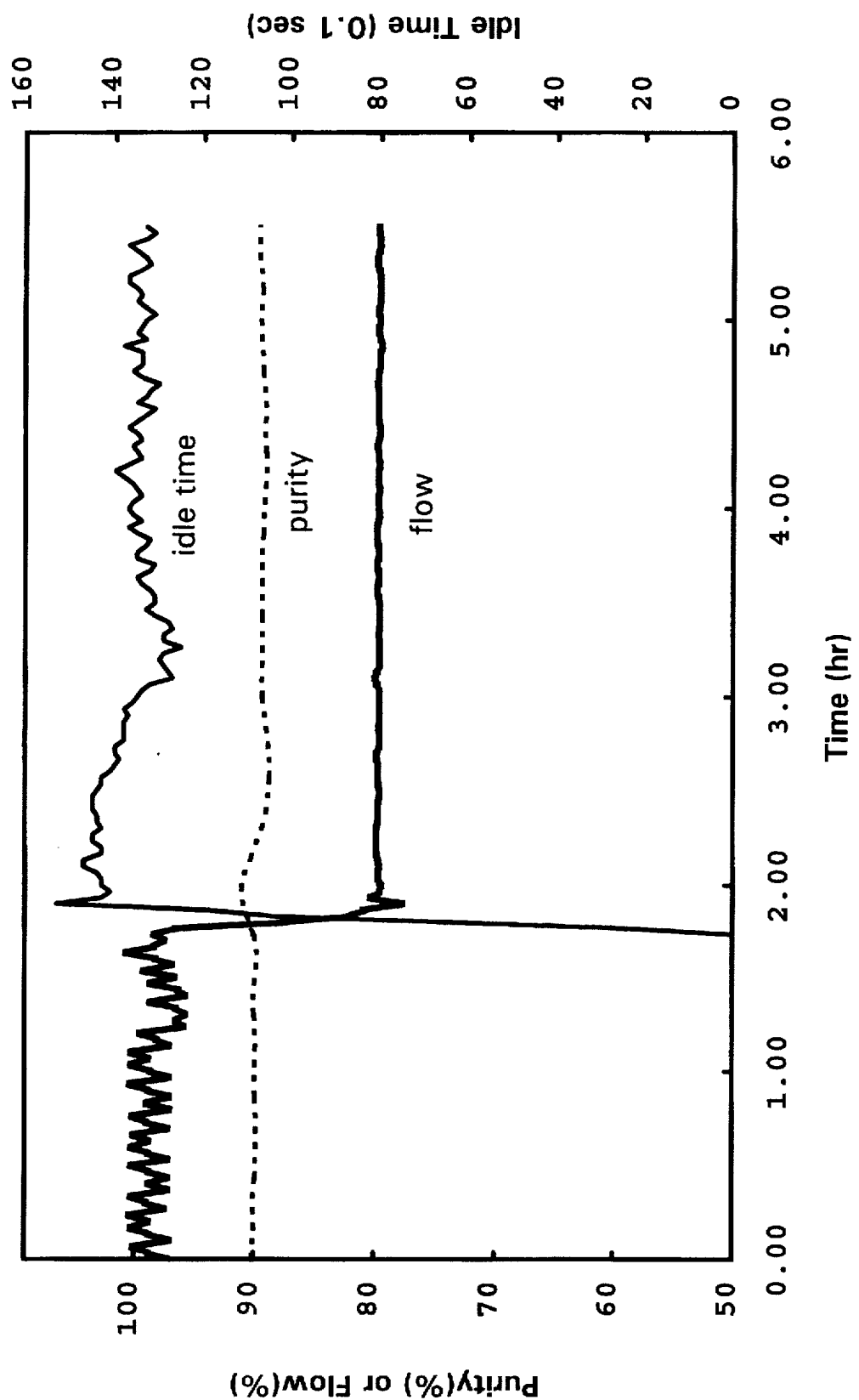
FIG. 4 is a graph showing the relationship between the flow rate, purity level and idle step duration when the product demand is reduced to 81.5% of the original flow rate.
Figure 5:
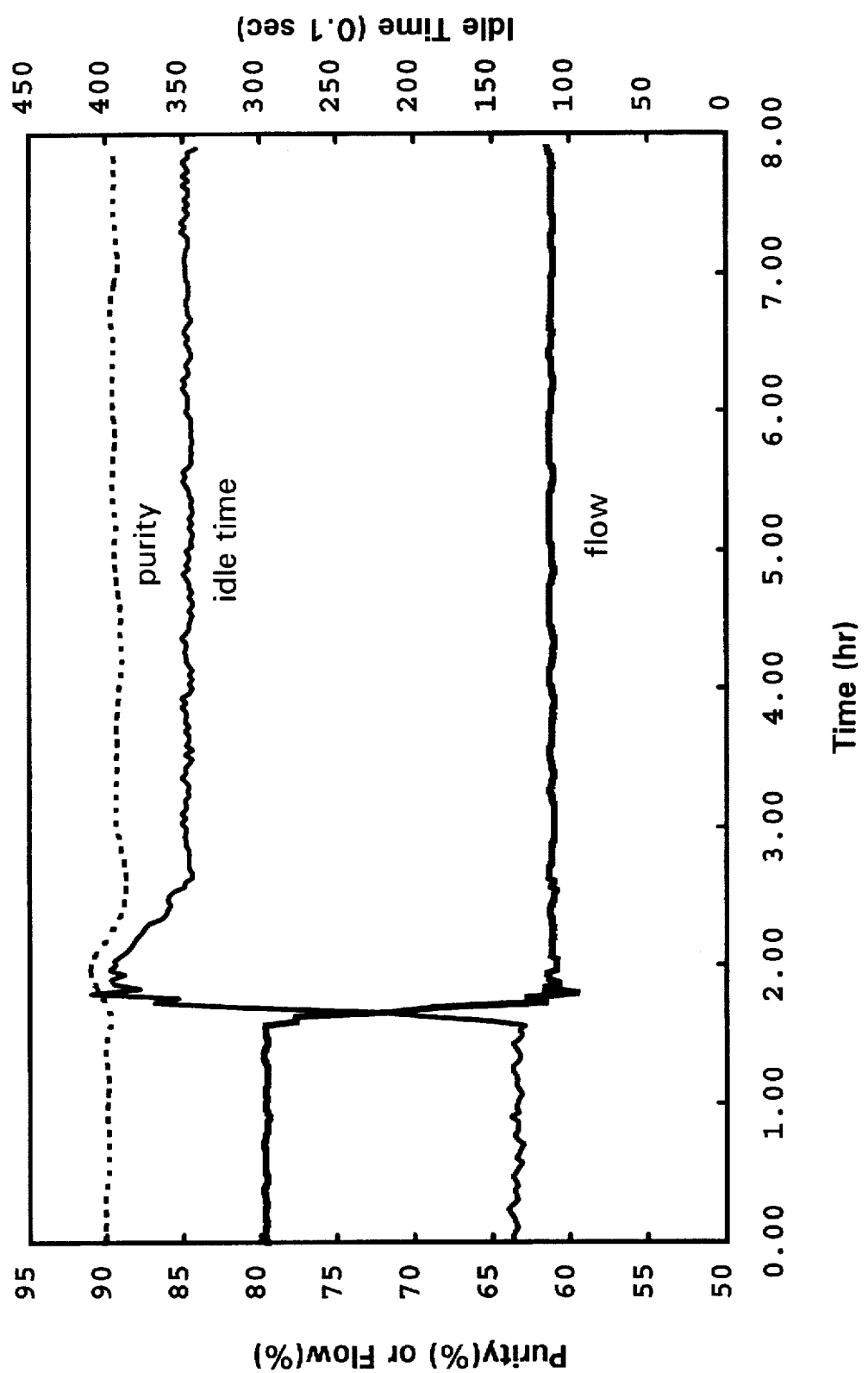
FIG. 5 is a graph showing the relationship between the flow rate, purity level and idle step duration when the product demand is reduced to 62.5% of the original flow rate.

An examination of the results tabulated in the Table show that in Run 2, in which a 14.7 sec. idle step was inserted into the adsorption cycle, the oxygen product gas flow rate was reduced from 6.4 to 5.22 Nm³/Hr (a reduction to 81.5% of the original flow rate). The purity of the oxygen product gas stream was maintained at the desired 90% by readjusting the duration of the idle step to 13.5 secs.(a reduction of 1.2 secs. from the initial 14.7 sec. idle step duration). FIG. 4, the graph showing the change from the Run 1 rate to the Run 2 rate, shows that when the flow rate was cut back (after about 1.75 hours of operation) the product gas purity increased slightly, but after insertion of the idle step into the cycle the purity dropped. After correction for purity variation the product gas purity eventually returned to about 90%. In Run 3, in which a 39 sec. idle step was inserted into the adsorption cycle, the oxygen product gas flow rate was reduced to 4 Nm³/hr( a reduction to 62.5% of the original flow rate). The purity of the oxygen product gas stream was maintained at the desired 90% by readjusting the duration of the idle step to 35 secs. (a reduction of 4 secs. from the initial 39 sec. idle step duration). FIG. 5, the graph showing the change from the Run 2 rate to the Run 3 rate, shows that when the duration of the idle step was further increased to adjust the system for the reduction in flow from 5.22 to 4 Nm³/hr, the purity varied slightly, but it became steady at about 90% oxygen after correction of the idle step duration to compensate for purity variation.

The above runs show that the flow rate of nonadsorbed gas from a PSA plant can be reduced by inserting an idle step into the adsorption cycle, and that the desired purity level can be maintained at the reduced flow rate by making minor adjustments to the duration of the idle step.

Although the invention has been described with particular reference to specific equipment arrangements and process steps and to specific experiments, these features are merely exemplary of the invention and variations are contemplated. For example, although the invention was described with particular emphasis on reducing the production rate of a PSA plant, it can be used to increase the production rate from an earlier rate that was below the maximum rate for the plant. The scope of the invention is limited only by the breadth of the appended claims.

What is claimed is:

1. In a method of producing a gas enriched in a first component at a specified purity and at a rate of production set by downstream demand for said gas by subjecting a gas mixture comprising said first component and a second component to a pressure swing absorption process in a system comprising a plurality of adsorption vessels each containing an adsorbent which adsorbs said second component more strongly than it adsorbs said first component, said pressure swing adsorption process having a repeating cycle which includes the steps:

(a) flowing said gas mixture at a selected pressure cocurrently through a first adsorption vessel of said system, thereby adsorbing second component-enriched fraction and discharging first component-enriched gas from said first adsorption vessel;

(b) partially pressurizing a second adsorption vessel of said system by flowing gas from said first vessel into said second vessel; and (c) pressurizing said second adsorption vessel to said selected pressure by cocurrently flowing said gas mixture thereinto;

the improvement comprising changing the rate of production of said first component-enriched gas in said system in response to a change in downstream demand of said first component-enriched gas by periodically isolating each vessel of said system and subjecting said system to an idle step between steps (b) and (c).

2. The improved method of claim 1, wherein during a given cycle, said idle step has a duration equal to the difference between (1) the product of the duration of the cycle immediately preceding said given cycle, determined without adjustment for purity, and the ratio of the downstream demand immediately preceding said change in downstream demand to the downstream demand immediately following said change in downstream demand and (2) the duration of said given cycle without an idle step.

3. The improved method of claim 1 or claim 2, further comprising measuring the purity of the first component-enriched gas and adjusting the idle step in a manner that will minimize the difference between the specified purity and the purity of said first component-enriched gas.

4. The method of claim 1, further comprising between the idle step and step (c) the step of further pressurizing said second adsorption vessel by countercurrently flowing gas enriched in said first component thereinto.

5. The improved method of claim 1, wherein said plurality of adsorption vessels comprises three adsorption vessels operated 120° out of phase.

6. A method of producing a gas enriched in a first component at a specified purity by subjecting a gas mixture comprising said first component and a second component to a pressure swing adsorption process in a system comprising at least one pair of first and second adsorption vessels operated 180° out of phase, each adsorption vessel containing an adsorbent which adsorbs said second component more strongly than it adsorbs said first component, said pressure swing adsorption process having a repeating cycle which comprises, with respect to each pair of adsorption vessels in said system, the steps:

(a) flowing said gas mixture cocurrently through said first adsorption vessel at a selected pressure, thereby adsorbing second component-enriched fraction and discharging first component-enriched gas from said first adsorption vessel, while desorbing second component-enriched fraction from said second adsorption vessel by countercurrently depressurizing said second adsorption vessel;

(b) partially pressurizing said second adsorption vessel by flowing gas from said first adsorption vessel into said second adsorption vessel;

(c) isolating said first and said second adsorption vessels and idling said process;

(d) flowing said gas mixture at said selected pressure cocurrently through said second adsorption vessel, thereby adsorbing second component-enriched fraction and discharging first component-enriched gas from said second adsorption vessel, while desorbing second component-enriched fraction from said first adsorption vessel by countercurrently depressurizing said first adsorption vessel;

(e) partially pressurizing said first adsorption vessel by flowing gas from said second adsorption vessel into said first adsorption vessel; and (f) isolating said first and said second adsorption vessels and idling said process.

7. The method of claim 6, wherein during a given cycle, steps (c) and (f) have a duration equal to the difference between (1) the product of the duration of the cycle immediately preceding said given cycle, determined without adjustment for purity, and the ratio of the downstream demand immediately preceding said change in downstream demand to the downstream demand immediately following said change in downstream demand and (2) the duration of said given cycle without an idle step.

8. The method of claim 6 or claim 7, further comprising measuring the purity of said first component-enriched gas and adjusting steps (c) and (f) in a manner that will minimize the difference between the specified purity and the purity of said first component enriched gas.

9. The method of claim 6, further comprising between step (c) and step (d), the additional step of further pressurizing said second adsorption vessel by countercurrently flowing gas enriched in said first component thereinto and between steps (f) and (a), the additional step of further pressurizing said first adsorption vessel by countercurrently flowing gas enriched in said first component thereinto.

10. The process of claim 9, further comprising between steps (a) and (b) the additional step of flowing said gas mixture at said selected pressure cocurrently through said first adsorption vessel at said selected pressure and discharging said first component-enriched gas from said first adsorption vessel, while countercurrently flowing gas enriched in said first component through said second adsorption vessel; between step (c) and said additional step between steps (c) and (d), the further step of flowing void space gas from said first adsorption vessel to said second adsorption vessel while countercurrently removing gas from said first vessel; between steps (d) and (e) the additional step of flowing said gas mixture at said selected pressure cocurrently through said second adsorption vessel at said selected pressure and discharging said first component-enriched gas from said second adsorption vessel, while countercurrently flowing gas enriched in said first component through said first adsorption vessel; and between step (f) and said additional step between steps (f) and (a), the further step of flowing void space gas from said second adsorption vessel to said first adsorption vessel while countercurrently removing gas from said second adsorption vessel.

11. The process of claim 6, further comprising between steps (a) and (b) the additional step of flowing said gas mixture cocurrently through said first adsorption vessel at said selected pressure and discharging first component-enriched gas from said first adsorption vessel, while countercurrently flowing gas enriched in said first component through said second adsorption vessel, and between steps (d) and (e) the additional step of flowing said gas mixture cocurrently through said second adsorption vessel at said selected pressure and discharging first component-enriched gas from said second adsorption vessel, while countercurrently flowing gas enriched in said first component through said first adsorption vessel.

12. The method of claim 6, further comprising, between steps (c) and (d), the additional step of flowing void space gas from said first adsorption vessel to said second adsorption vessel while countercurrently removing gas from said first adsorption vessel and, between steps (f) and (a), the additional step of flowing void space gas from said second adsorption vessel to said first adsorption vessel while countercurrently removing gas from said second adsorption vessel.

13. The method of claim 1 or claim 6, wherein said first component is oxygen and said second component is nitrogen.

14. The method of claim 13, wherein said gas mixture is air.

15. The method of claim 14, wherein said selected pressure is in the range of about atmospheric pressure to about 3 bara.

16. The method of claim 13, wherein said adsorbent is selected from synthetic and natural zeolites.

17. The process of claim 16, wherein said adsorbent is a synthetic zeolite selected from type X zeolite and type A zeolite.

18. The method of claim 1 or claim 6, wherein said first component is nitrogen and said second component is oxygen.

* * * * *